PASSIVE GAS CELL FREQUENCY STANDARD IN THE MILLIMETER WAVE RANGE

Filed Nov. 6, 1963

INVENTOR.
GÜNTER SCHULTEN
BY
AGENT

United States Patent Office 3,316,511

Patented Apr. 25, 1967

3,316,511

PASSIVE GAS CELL FREQUENCY STANDARD IN THE MILLIMETER WAVE RANGE

Günter Schulten, Hamburg, Schnelsen, Germany, assignor to North American Philips Company, Inc., New York, N.Y., a corporation of Delaware Filed Nov. 6, 1963, Ser. No. 321,848
Claims priority, application Germany, Dec. 5, 1962, P 30,702
2 Claims. (Cl. 333—76)

The absolute measurement of frequencies in the micro-wave range is usually effected by converting a calibration frequency in the kc./s. or mc./s. range (quartz) into a frequency in the micro-wave range (from $10^9$–$10^{10}$ c./s.) by means of frequency multiplication. The frequency multiplication is performed with the aid of amplifier tubes or crystal diodes.

Although in the millimeter wave range this method of frequency measurement is feasible, it is laborious and difficult, because no suitable amplifiers for the said high frequencies are available.

On the other hand, in the micro-wave range there are resonance absorptions in gases, which increase in intensity with increase in the frequency.

The frequency at which the absorption takes place, is a property of the gas molecule used and hence a molecule constant substantially independent of any external influences. A large number of such molecule resonances have been measured with a high degree of accuracy and hence can be used as calibration frequencies. The resonances are observed in so-called absorption tubes, which generally are long wave-guides adapted to be filled with the relevant gas.

The following relationships have been found:

The bandwidth of the absorption is a function of the gas pressure: small pressure=small bandwidth.

The depth of the absorption is substantially independent of the pressure but proportional to the length of the absorption path.

In order to obtain clearly visible and narrow absorption lines, long tubes (of several meters) and low pressure ($\approx 10^{-3}$ torre) have hitherto been required. In addition to the length of the path and to the pressure of the gas the so-called saturation is a significant factor, for beyond a given energy density of the micro-wave field the depth of the absorption decreases with increasing energy. With a sufficiently high energy density the absorption lines may even disappear completely.

The invention relates to a passive frequency standard in the micro-wave range which is characterized by two plane parallel plates arranged in a sealed gas-filled vessel with a mutual spacing of $n \cdot \lambda/2$, between which a mica foil inclined to the plates through 45° is interposed to provide input coupling of the micro-wave energy.

Instead of an absorption tube a resonator is used.

In the construction of the resonator a compromise is preferably made in view of the observation that a high quality provides deep absorption lines but may readily result in saturation, which may, however, be decreased by a larger volume.

If Q (loaded quality) represents the quality of the resonator and $\lambda$ represents the wave length, with respect to the absorption depth such a resonator corresponds to an absorption tube having a length $L'=Q\lambda/2\pi$. With the aid of the resonator comparatively deep absorption lines may be obtained, the advantage of the resonator consisting in its dimensions which render it convenient to handle. The resonator is a line resonator, that is to say, it consists of a line having the length $L=n\lambda/2$ with short circuits at both ends, $n$ being an integer, for example 20.

In order that the invention may readily be carried into effect, an embodiment thereof will now be described, by way of example, with reference to the accompanying diagrammatic drawings, in which.

Figure 1:
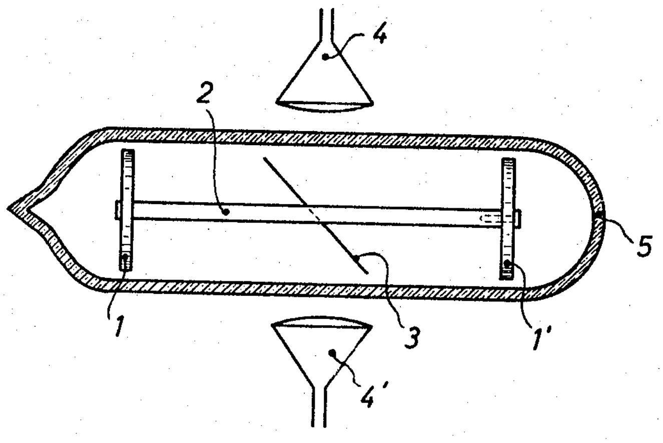
FIG. 1 is a cross-sectional view of the resonator.
Figure 2:
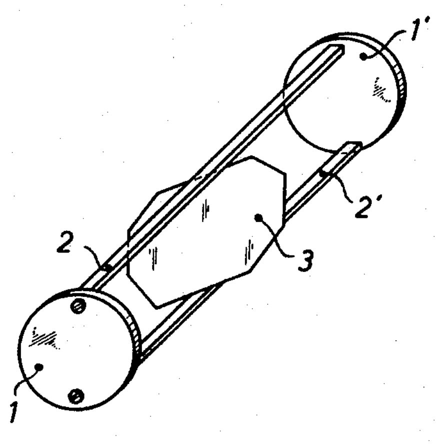
FIG. 2 is a plan view of the inner portion of the resonator.

In FIG. 1 two plane parallel metal plates 1, 1' secured to a support rod 2 form a resonator for the wave length $\lambda$ if their spacing $L'=n\lambda/2$. The quality of the resonance increases with the surface area of the plates, for the losses are produced not only by wall currents in the plates but also by diffraction at the edges of the plates. Between the plates a thin planar mica foil 3 (0.06 mm.) is interposed so as to be inclined through 45° to the planes of the plates. It serves for input coupling of the micro-wave energy.

The resonator is closed in a vacuum-tight manner in a cylindrical glass vessel 5 containing the calibration gas and is adjusted to the calibration frequency. The micro-wave energy enters with the aid of a horn radiator 4 through the glass wall 5, excites the resonator and may be received by an identical horn 4' disposed at the opposite side. The resonance absorption may be observed in the receiving horn 4'.

What is claimed is:

1. A passive frequency standard in the millimeter wave range, comprising two plane parallel metal plates arranged in a sealed gas-filled vessel and having a mutual spacing of $n \cdot \lambda/2$, and a thin mica foil interposed between said plates and inclined at an angle of 45° to the plates for input coupling of the micro-wave energy.

2. A frequency standard as claimed in claim 1, characterized in that the gas-filled vessel lies between two horn radiators.

References Cited by the Examiner

UNITED STATES PATENTS

| | | | |
|---|---|---|---|
| 2,774,876 | 12/1956 | Dicke | 333—76 |
| 3,200,342 | 8/1965 | Kibler | 330—4.5 |
| 3,201,709 | 8/1965 | Boyd | 330—4.5 |

HERMAN KARL SAALBACH, *Primary Examiner*.

L. ALLAHUT, *Assistant Examiner*.